United States Patent [19]
Cook et al.

[11] Patent Number: 5,851,572
[45] Date of Patent: Dec. 22, 1998

[54] METHOD OF INCREASING FAT FIRMNESS AND IMPROVING MEAT QUALITY IN ANIMALS WITH CONJUGATED LINOLENIC ACID

[75] Inventors: Mark E. Cook; Daria L. Jerome; Michael W. Pariza; Dennis R. Buege, all of Madison, Wis.

[73] Assignee: Wisconsin Alumni Research Foundation, Madison, Wis.

[21] Appl. No.: 845,535

[22] Filed: Apr. 25, 1997

[51] Int. Cl.⁶ ..................................................... A23K 1/00
[52] U.S. Cl. ................................................. 426/2; 426/807
[58] Field of Search ........................................ 426/2, 807

[56] References Cited

U.S. PATENT DOCUMENTS

| | | | |
|---|---|---|---|
| 4,603,142 | 7/1986 | Burger et al. | 514/456 |
| 4,868,001 | 9/1989 | Maruta | 426/623 |
| 5,017,614 | 5/1991 | Pariza et al. | 514/558 |
| 5,070,104 | 12/1991 | Pariza et al. | 514/549 |
| 5,162,337 | 11/1992 | Elbrecht et al. | 514/300 |
| 5,428,072 | 6/1995 | Cook et al. | 514/560 |
| 5,430,066 | 7/1995 | Cook et al. | 514/558 |
| 5,554,646 | 9/1996 | Cook et al. | 514/560 |

FOREIGN PATENT DOCUMENTS

| | | |
|---|---|---|
| 61-216658 | 10/1986 | Japan . |
| 05268882 | 10/1993 | Japan . |
| 1464924 | 4/1974 | United Kingdom . |
| 9416690 | 8/1994 | WIPO . |
| 95/22598 | 8/1995 | WIPO . |
| 9606605 | 7/1996 | WIPO . |

OTHER PUBLICATIONS

Y.L. Ha; N.K. Grimm and M.W. Pariza, *Carcinogenesis*, vol. 8, No. 12, pp. 1881–1887 (1987).

Y.L. Ha; N.K. Grimm and M.W. Pariza, J. Agric. Food Chem., vol. 37, No. 1, pp. 75–81 (1987).

M.W. Pariza, Food Research Institute 1988 Annual Fall Meeting, Oct. 12, 1988.

The Merck Index, Tenth Edition (1983), p. 790.

The Merck Veterinary Manual, Fifth Edition (1979), pp. 1340–1343 and 1374 and 1379.

*Primary Examiner*—Chhaya D. Sayala
*Attorney, Agent, or Firm*—Quarles & Brady

[57] ABSTRACT

A method of treating meat animals to increase fat firmness and meat quality indices which increases meat processability consists of administering to the meat animals a safe and effective amount of conjugated linoleic acid or CLA.

9 Claims, No Drawings

5,851,572

METHOD OF INCREASING FAT FIRMNESS AND IMPROVING MEAT QUALITY IN ANIMALS WITH CONJUGATED LINOLENIC ACID

CROSS REFERENCE TO RELATED APPLICATION

Not Applicable

FEDERALLY SPONSORED RESEARCH

Not Applicable

FIELD OF THE INVENTION

The present application generally relates to methods of treating animals. More particularly, it relates to a method of treating animals to improve meat quality.

BACKGROUND OF THE INVENTION

As the American population increasingly uses unsaturated fats in food preparation, the resulting spent restaurant greases are increasingly unsaturated. These greases/oils are in turn used by the animal feed industries to feed meat animals, such as pigs. Because of the high degree of unsaturation of these oils, animals eating these oils have softer fat and tissue. In addition, corn is being genetically selected for higher levels of unsaturated fats. Since corn is a major component of animals diets, the use of high oil corn in place of saturated fat also soften fats and tissues. This creates a major problem in slicing meats (e.g. bacon). The soft fat gums up the cutting line in bacon slicing operations that normally operate 24 hours a day.

The only method previously known to assure a firm fat was to feed animals fats or oils high in saturated fats. Due to current trends in human nutrition, such fats are less available for animal feeding. Also, the use of high oil corn varieties decreases the level of added animal fat in diets.

BRIEF SUMMARY OF THE INVENTION

It is the object of the present invention to disclose a method of increasing fat firmness and to increase meat quality of meat animals, such as pigs.

We have made the surprising discovery that feeding meat animals a conjugated linoleic acid, which is an unsaturated fat, counteracts the adverse effects of the increased unsaturated fat in the diet of the meat animals and results in the production of meat of improved quality which has a firmer fat.

The method of the present invention comprises administering to an animal intended for meat a safe amount of a conjugated linoleic acid, such as 9,11-octadecadienoic acid and 10,12-octadecadienoic acid, a non-toxic salt of a conjugated linoleic acid, an active ester of a conjugated linoleic acid, an active isomer of a conjugated linoleic acid, an active metabolite of a conjugated linoleic acid or a mixture thereof, which is effective to improve meat quality and to increase the firmness of the fat in the meat which also improves the quality of the meat. The increased firmness of the fat allows for improved processing, such as slicing of pork bellies into bacon. The method of the present invention also allows the feed industry to feed a higher concentration of unsaturated fatty acid (i.e. vegetable oil) to meat animals without causing undesirable soft tissue and soft fat meat products.

The conjugated linoleic acids, their non-toxic salts, active esters, active isomers, active metabolites, and mixtures thereof are collectively referred to herein as "conjugated linoleic acid" or "CLA".

It will be apparent to those skilled in the art that the aforementioned objects and other advantages may be achieved by the practice of the present invention.

DESCRIPTION OF THE PREFERRED EMBODIMENT

In the preferred method of the present invention, the CLA is orally administered to the animal in a safe amount which is effective to improve meat quality and to increase the firmness of the fat in the animal which also improves the quality of meat obtained from the animal. Because of the differences in ages, size and nature of animals, the amounts which are safe and effective may vary considerably. Since CLA is a natural food ingredient and it is relatively non-toxic, the amounts which can be administered in the methods of the invention are not critical as long as they are enough to be effective.

The practice of the present invention is further illustrated by the example which follows:

EXAMPLE 1

Pig weighing approximately 55 pounds were fed 0., 0.5 or 1.0 percent CLA by weight in their diet. After three and a half months, the pigs were slaughtered and the carcasses cooled prior to processing. When the carcasses were removed, a visible difference was seen between the stiffness of the pork bellies and subcutaneous fat of the control pigs and the pigs fed CLA. The pork bellies and subcutaneous fat from the CLA-fed animals were firmer and the bellies did not collapse when hung over a rod. The bellies were scored for appearance, consistency and fat firmness. Also, indices of meat quality (color, marbling, and water holding capacity) were determined. The results are shown in Tables 1 and 2.

TABLE 1

MEASURE OF MUSCLE QUALITY

| Treatment | Subjective Color [1] | Subjective Marbling [2] | Minolta L* [3] | Minolta a+ [3] | Water Holding Capacity (mg) [4] |
|---|---|---|---|---|---|
| Control | 2.2 ± 0.70 | 1.9 ± 0.6 | 49 ± 3 | 9.9 ± 3 | 96.2 ± 52 |
| 0.5% CLA | 2.5 ± 0.53 | 2.1 ± 0.4 | 47 ± 4 | 9.3 ± 2 | 80 ± 63 |
| 1.0% CLA | 2.9 ± 0.4 | 2.2 ± 0.5 | 47 ± 4 | 10.1 ± 3 | 78.8 ± 41 |

Measurements taken on the longissimus dorsi muscle.
[1] Subjective Color: This is based on a score of 1–5 with one being undesirable, 3–4 preferable, and 5 too dark.
[2] Subjective Marbling: This is a score of 1–5 with 1 meaning very little to no marbling (intramuscular fat) and 5 having a lot of marbling (equal to a prime quality grade). Today's trends would lean in the 2–3 range.
[3] Minolta Colorimeter readings: The L* value is a measure of lightness with the higher values being more light (closer to white). Pork should not be white in color; if it is this is an indication of PSE (pale, soft, exudative). PSE pork is very undesirable due to its off taste, poor binding characteristic, and loss of water. The a+ value is redness of the meat with the higher value meaning it is more red.
[4] Water Holding Capacity: This is another measure of PSE. It is done by placing a piece of filter paper on the muscle after it has been exposed for 10 minutes (bloomed) and then weighing the amount of moisture picked up on the paper in mg.

TABLE 2

MEASURES OF FAT FIRMNESS

| Treatment | Subjective Firmness[1] | Belly Stiffness Span (inches)[2] |
|---|---|---|
| Control | 2.5 ± .9 | 9.9 ± 6.5 |
| 0.5% CLA | 2.9 ± .6 | 13.3 ± 1.6 |
| 1.0% CLA | 3.1 ± .6 | 20.3 ± 2.1 |

[1]Subjective Firmness: This is a score of 1–5 with one being extremely soft to handle and 5 very firm to handle, preferred is around a 3–4.
[2]Belly stiffness was measured by hanging bellies lean side up over a rod and measuring the distance in inches between the belly ends. The greater the distance, the stiffer the belly.

As can be seen from the above, the pigs fed CLA diets containing CLA had better muscle quality and pork bellies which were significantly better for making bacon than the bellies of the control pigs.

The method of the present invention may take several embodiments. In one embodiment, the CLA is added to an animal's diet by adding the CLA to feed. In another embodiment, the CLA can be administered to an animal in a veterinary composition containing a safe and effective dose of the CLA. In still another embodiment, the meat animal is fed a food product, such as milk, vegetable oils or egg solids, which have been enriched so that they contain high concentrations of CLA.

The feed and veterinary preparations for use in the methods of the present invention preferably are those containing the CLA in the form of a free fatty acid or triglyceride esters in combination with a conventional feed or approved veterinary diluent. Other active forms of CLA including, without limitation, the non-toxic salts and mixtures can be used.

The free conjugated linoleic acids (CLA) have been previously isolated from fried meats and described as anti-carcinogens by Y. L. Ha, N. K. Grimm and M. W. Pariza, in Carcinogenesis Vol. 8, No. 12, pp. 1881–1887 (1987). Since then, they have been found in some processed cheese products (Y. L. Ha, N. K. Grimm and M. W. Pariza, in J. Agric. Food Chem., Vol. 37, No. 1, pp. 75–81 (1987)).

The free acid forms of the CLA may be prepared by isomerizing linoleic acid. The non-toxic salts of the free CLA acids may be made by reacting the free acids with a non-toxic base. Natural CLA may also be isolated from tallow or prepared from linoleic acid by the action of $W^{12}$-cis, $W^{11}$-transisomerase from a harmless microorganism such as the Rumen bacterium *Butyrivibrio fibrisolvens*. Harmless microorganisms in the intestinal tracts of rats and other monogastric animals may also convert linoleic acid to CLA (S. F. Chin, W. Liu, K. Albright and M. W. Pariza, 1992, FASEB J.6:Abstract #2665).

The CLA obtained by the practice of the described methods of preparation contains one or more of the 9,11-octadecadienoic acids and/or 10,12-octadecadienoic acids and active isomers thereof. It may be free or bound chemically through ester linkages. The CLA is heat stable and can be used as is, or dried and powdered. The free acids are readily converted into non-toxic salts, such as the sodium or potassium salts, by reacting chemically equivalent amounts of the free acid with an alkali hydroxide at a pH of about 8 to 9.

Theoretically, 8 possible geometric isomers of 9,11- and 10,12-octadecadienoic acid (c9,c11; c9,t11; t9,c11; t9,t11; c10,c12; c10,t12; t10,c12 and t10,t12) would form from the isomerization of c9,c12-octadecadienoic acid. As a result of the isomerization, only four isomers (c9,c11; c9,t11; t10,c12; and c10,c12) would be expected. However, of the four isomers, c9,t11- and t10,c12- isomers are predominantly produced during the autoxidation or alkali-isomerization of c9,c12-linoleic acid due to the co-planar characteristics of 5 carbon atoms around a conjugated double-bond and spatial conflict of the resonance radical. The remaining two c,c-isomers are minor contributors.

The relatively higher distribution of the t,t-isomers of 9,11- or 10,12-octadecadienoic acid apparently results from the further stabilization of c9,t11- or t10,c12-geometric isomers, which is thermodynamically preferred, during an extended processing time or long aging period. Additionally the t,t-isomer of 9,11- or 10,12-octadecadienoic acid that was predominantly formed during the isomerization of linoleic acid geometrical isomers (t9,t12-, c9,t12- and t9,c12-octadecadienoic acid) may influence the final ratio of the isomers or the final CLA content in the samples.

Linoleic acid geometrical isomers also influence the distribution of minor contributors (c,c-isomers of 9,11- and 10,12-, t9,c11- and c11,t12-octadecadienoic acids). The 11,13-isomer isomer might be produced as a minor product from c9,c12-octadecadienoic acid or from its isomeric forms during processing.

The CLA can be administered in the form of veterinary compositions, such as solutions or emulsions. The exact amount to be administered, of course, depends upon the form of CLA employed, and the route of administration.

The preferred veterinary compositions of CLA contain the non-toxic sodium or potassium salt of CLA in combination with a suitable diluent. In addition to solutions or suspensions intended for oral administration, the composition can be a powder or a crushable tablet. When the compositions are solutions or suspensions intended for parenteral administration the preferred diluent will be Sterile Water for Injection U.S.P.

The amounts of CLA to be added to an animal's feed can range from about 0.01% to about 5.0% or more by weight of the animal's diet. The animal can be fed a diet containing the CLA from birth to harvesting or for some other period until at least some of beneficial effects of the CLA feeding on fat firmness are obtained.

In addition to increasing the fat firmness and meat quality of pigs the method of the present invention is useful in increasing the firmness of the fat of other meat animals such as cattle, horses, sheep and goats.

It also will be readily apparent to those skilled in the art that a number of modifications or changes may be made without departing from the spirit and scope of the present invention. Therefore, the invention is only to be limited by the claims.

We claim:

1. A method of improving the fat firmness and meat quality of a meat animal which comprises administering to a meat animal an amount of conjugated linoleic acid (CLA) which is effective to increase the fat firmness and quality indices of the animal's meat.

2. The method of claim 1 in which the animal is a pig.

3. The method of claim 1 in which the CLA is a free conjugated linoleic acid.

4. The method of claim 1 in which the CLA is a non-toxic salt of a conjugated linoleic acid.

5. The method of claim 1 in which the CLA is an ester of a conjugated linoleic acid.

6. The method of claim 1 in which the CLA is administered orally.

7. The method of claim 1 in which the CLA is administered parenterally.

8. A method of counteracting soft fat and tissue caused by unsaturated fat in the diet of a meat animal which comprises administering to a meat animal an amount of conjugated linoleic acid (CLA) which is effective to counteract said soft fat and tissue.

9. A method of modifying an animal food to increase the ability of the animal food to counteract soft fat and tissue caused by unsaturated fat in the diet of an animal, said method comprising adding to said animal food an amount of conjugated linoleic acid (CLA), said amount being effective to counteract soft fat and tissue caused by unsaturated fat in the diet of the animal.

* * * * *